(12) United States Patent
Shpakow

(10) Patent No.: US 7,415,887 B2
(45) Date of Patent: Aug. 26, 2008

(54) FLUID PRESSURE TESTING DEVICE METHOD AND TAP ASSEMBLY THEREFOR

(76) Inventor: Thomas Shpakow, 4212 W. Pondview Pl., Littleton, CO (US) 80123

( * ) Notice: Subject to any disclaimer, the term of this patent is extended or adjusted under 35 U.S.C. 154(b) by 393 days.

(21) Appl. No.: 11/013,497

(22) Filed: Dec. 15, 2004

(65) Prior Publication Data

US 2005/0211024 A1 Sep. 29, 2005

Related U.S. Application Data

(60) Provisional application No. 60/556,718, filed on Mar. 25, 2004.

(51) Int. Cl.
*G01L 7/00* (2006.01)
(52) U.S. Cl. ............................. 73/756; 340/451; 81/43
(58) Field of Classification Search .................. 73/756; 81/3, 43, 64; 340/457
See application file for complete search history.

(56) References Cited

OTHER PUBLICATIONS

"Mastercool", printed from All-Tool Discount Auto Tools website, (1 page).
"3-IN-1 Side Can Tap", printed from Enviro-Safe website(1 page).
"CPS Dual Side Can Tap Valve", printed from Northern Tool + Equipment website (1 page).
"A/C Can Tap FRE", printed from etoolcart.com Automotive Specialty Tools website (1 page).

*Primary Examiner*—Jewel V. Thompson
(74) *Attorney, Agent, or Firm*—Michael R. Henson; John W. Carpenter

(57) ABSTRACT

A tap assembly and method for mounting on a compound of a fluid system to test fluid in the system employs a non-elastic yet flexible band adapted to extend around a portion of the shell of the component. A tap having a fluid passageway is disposed on the band. Pliers, a ratchet or other structure may used to tighten the band thereby to force the tap to penetrate the shell of the component and establish fluid communication with the fluid therein. In one embodiment, the band is formed as two connectible sections to allow adjustability in size. The assembly and method are especially used for measuring oil pressure in an oil filter.

44 Claims, 4 Drawing Sheets

FLUID PRESSURE TESTING DEVICE METHOD AND TAP ASSEMBLY THEREFOR

FIELD OF THE INVENTION

The present invention broadly concerns machinery, but it is especially concerns lubrication systems for such machinery. More particularly, this invention concerns the measurement of oil pressure for machinery for diagnostic evaluation. The invention specifically addresses the detection of oil pressure in motorized vehicles and the like. As such, the invention is directed to a tap assembly adapted to tap into a component of a lubrication system for use with a pressure gauge to measure the pressure of the system.

BACKGROUND OF THE INVENTION

The modern standard of living is based in large part upon the presence of machines designed to perform a variety of tasks. Machines help extract natural resources from the earth, and machines help transform those raw materials into finished goods. Machines are used to process food, and to transport water for consumption by the population. Machines are employed for transportation and recreation. Other machines are used for cooking, cleaning and maintaining homes.

Such machines, regardless of their field of application, typically involve component parts which are assembled together and which, during operation of the machine, move with respect to one another. Where two moving parts contact one another, friction exists and heat builds up. On one hand, such heat decreases the efficiency of the machine while, on the other hand, excess heat can deteriorate the machine and/or destroy its functionality. The amount of heat, of course, depends upon the coefficient of friction between the moving parts as well as the force of contact between them.

It is well known to try to reduce friction between two moving parts by reducing the coefficient of friction between them. Commonly, this is accomplished by a lubricating material whether it be a permanent lubricious coating or a transient lubricating fluid. It is known to provide certain machines with dynamic lubrication systems. In such systems, a lubricating fluid reservoir is provided and, during operation of the machine, the lubricating medium is circulated through the machine so as to provide a ready source of lubricating fluid to the moving parts. Often, a filter is provided as a component of such lubricating systems so that the lubricating fluid is passed through the filter to remove unwanted contaminants, especially particulate material, that could damage the contacting surfaces of the parts which are being lubricated. Moreover, such systems typically rely on supplying the lubricating fluid within as prescribed pressure range.

An example of such a machine is the internal combustion engine that remains the dominant power plant for motorized transportation. In such systems, the combustion of fuel in cylinders reciprocates a piston head so that the energy released may be transferred to an output through a desired mechanical linkage. The reciprocating cycle of the piston head within the cylinder can occur many thousands of times per minute. While some internal combustion engines rely on other techniques to lubricate the sliding surfaces of the piston head in the cylinder as well as other moving parts in the engine, many such engines employ dynamic lubrication as a subsystem thereof.

Since the health of these engines depends, in part, upon the proper functioning of the dynamic lubrication system, the monitoring of parameters associated with the lubrication and the diagnostic testing of those parameters plays an important part in the overall maintenance of the machine. One of the parameters commonly monitored and/or periodically measured is the pressure of the lubricating fluid during operation of the engine. Since oil is a typical lubricating fluid, this parameter is often referred to as "oil pressure". Some engines are provided with a real time oil pressure gauge that provides an ongoing readout of instantaneous oil pressure. However, many engines are not provided with such a gauge but rely on warning lights when oil pressure drops below a threshold value. Regardless of such real time monitoring, it is often desirable, in a diagnostic procedure, to perform an oil pressure check to verify the accuracy of the monitoring gauges or to identify other performance issues relating to the engine.

The existing diagnostic approach to testing oil pressure involves accessing the lubricating fluid during operation of the machine. A typical procedure involves removing the oil filter and thereafter threadably mating a cup-shaped cover to the mounting hole of the oil filter. This cover accesses the oil flow in the engine through the inlet port associated with the filter mount, but seals the remaining ports of the filter to prevent leakage. Adapters are provided so that the cover may mount to differently sized openings or where the opening have different thread pitches, depending upon the particular engine in question. An oil pressure gauge may then be connected to the adapter so as to read the oil pressure.

Another technique is to use an oil galley access on the engine block. Typically, the oil galley access is a threaded opening into the oil environment and communicates with the engine oil flow so that an oil pressure sending unit may be threadably mounted therein. This oil pressure sending unit, of course, is the detector that signals, for example, an oil pressure gauge on a vehicle dashboard. In order to use an oil galley access, the oil pressure-sending unit is removed, and an adapter is mounted into the access hole. The oil pressure gauge is then connected to this adapter.

These techniques both have drawbacks. For example, it is necessary to have a variety of adapters for the cup-shaped cover plate in order to match different sizes and pitches of the oil filter openings. Further, these cup-shaped cover plates do not have filtering capability so that, if contaminants are present, they may be passed through and into the engine thereby creating the risk of damage to the engine. In the case of utilization of the oil galley access, the oil galley access may be in a location on the engine block that it is difficult to reach. Indeed, in order to remove the oil pressure sending unit so that an adapter may be threaded into the galley access, other accessories of the engine, such as power steering and the like, may need to removed. This process can be exceedingly time consuming and expensive.

Accordingly, there is a need for a simplified device and method for obtaining a quick and reliable oil pressure reading. There is a need for a device which may operate with a variety of different oil filters without the need for complicated adapters. There is a further need for an oil pressure testing device and method that may be simply and quickly implemented with a minimum of effort. The present invention is directed to meeting these needs.

SUMMARY OF THE INVENTION

It is an object of the present invention to provide a new and useful device and method for measuring the pressure of the lubricating system.

It is another object of the present invention to provide a device and method for tapping into a lubricating system without the need for specialized components.

It is a further object of the present invention to provide a device which can be used in an easy method of testing oil pressure as part of a regular maintenance schedule during oil filter changes.

A still further object of the invention is to provide a device and method that can permit the reading of oil pressure in a dynamic oil system of a machine without requiring the removal of other systems associated with the machine.

According to the present invention, then, a tap assembly is adapted to mount on a component of the fluid system wherein the component has a shell and contains fluid under pressure in the component. Broadly, the tap assembly includes a non-elastic, yet flexible band having a length. This band is sized and adapted to extend around at least a portion of the shell when in a mounted state. A tap is disposed on and is supported by the band. This tap has a fluid passageway therethrough. The tap assembly then includes means for tightening the band when it is in the mounted state such that the tap is forcibly advanced against the shell thereby to penetrate the shell to define an active state. In the active state, the tap thereby establishes fluid communication with the fluid inside the component. In a more complete form of the invention, the tap assembly includes a pressure gauge assembly that is adapted to secure to the tap in fluid communication with the tap passageway. This pressure gauge assembly may include a hose and a pressure gauge.

In greater detail, the non-elastic, yet flexible band is shown to be constructed as a metal strap. This metal strap can have opposite end portions that include a flange, and a seat may be disposed on each of the flanges. These seats may be cup-shaped in configuration. In such instance, the means for tightening may include a pliers assembly adapted to engage the seats.

Several embodiments of the band are disclosed. The band may be C-shaped in configuration. Alternatively, the band may be formed by at least two band sections that are securable to one another. In this case, a connector is operative to secure the band sections together. Moreover, the band sections may be securable at selected locations thereby to adjust the length of the band.

As noted, the means for tightening the band may be a pliers assembly. The pliers assembly is operative to move between a more open position and a more closed position and engages the opposite end portions of the band, such as the flanges noted above. The pliers assembly many include a latch assembly that is operative to retain the pliers assembly in a more closed position. This latch assembly may include a ratchet structure associated therewith.

An alternative means for tightening can include a belt including a first belt end portion secured to the band and a spool engaging a second belt in portion. The belt may be wound about the spool thereby to tighten the band. First and second spaced apart belts may be provided, if desired, with each belt including a first belt end portion secured to the band and a second belt end portion adapted to be wound upon the spool. In either case, the spool may have a ratchet latch associated therewith. The ratchet latch is operative to prevent ratcheting rotation of the spool in a first rotational direction and to prohibit rotation of the spool in an opposite second rotational direction. The ratchet latch may also include a ratchet release that is operative to permit rotation of the spool in the second rotational direction.

The tap can include a piercing prong and a gasket. The piercing prong is operative to penetrate the sidewall of the shell. Here, the gasket is operative to help seal against the sidewall of the shell of the component when in the active state. In the disclosed embodiments, the component may be a cylindrical oil filter. Here, the band is sized and adapted to extend around the majority of the circumference of such oil filter.

The present invention is also directed to a method of measuring fluid pressure in a component of a fluid system wherein the component has a shell and an interior that contains fluid under pressure. Broadly, the method includes the step of placing a penetrating point of the tap that has a fluid passageway therethrough against a sidewall portion of the shell of the component. Next, the method includes the step of advancing the tap such that the penetrating point pierces the shell thereby establishing fluid communication with the fluid and the component. The method includes the step of substantially sealing the tap against the sidewall portion of the shell in such a manner so as to reduce any leakage of the fluid that is associated with the tap. The method then includes the step of measuring the pressure of the fluid in the passageway of the tap. The step of tapping the filter may be accomplished by driving a tap by placing a contracting force on a non-elastic yet flexible band that carries the tap. This applies a force radially inwardly against the sidewall of the component until the tap penetrates the sidewall to establish fluid communication. The step of advancing the tap may be accomplished by positioning such band around at least a portion of the shell so that the penetrating point is in a position against the sidewall portion of the shell. Thereafter, the band is tightened around the component such that the tap is forcefully advanced against the shell. The method may also include the step of lockably holding the tap in place while the oil pressure is measured. The step of measuring the pressure of the fluid in the passageway of the tap can be accomplished by securing a hose to the tap and measuring fluid pressure in the hose by means of a pressure gauge in fluid communication therewith.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention broadly concerns diagnostic techniques and devices used to test the pressure of a fluid in a dynamic fluid system system. More particularly, the present invention is directed to measure oil pressure in a lubrication system. Such systems are commonly found on internal combustion engines and other machinery. Thus, the present invention is described with respect to implementation with an internal combustion engine, but it should be appreciated that the device and techniques described herein may be used on other machinery, as well, and to other fluid systems. Accordingly, this invention should not be thought to be limited in any respect to internal combustion engines, only, or to oil lubrication systems.

Figure 1:
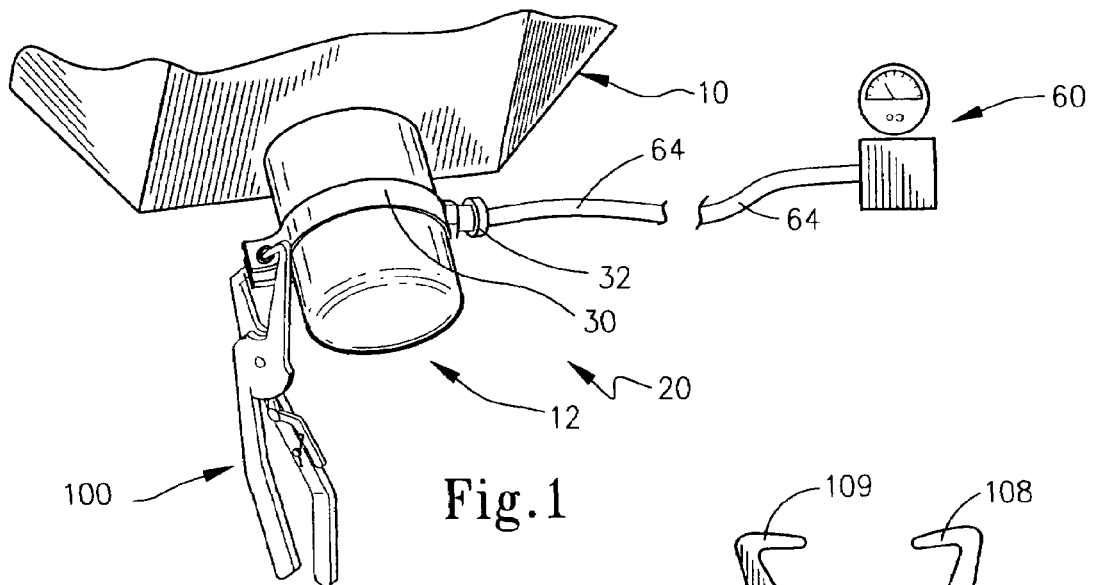
FIG. 1 is a perspective view showing the oil pressure measuring device according to the present invention in an operating mode which implements the method of the present invention.
Figure 2:
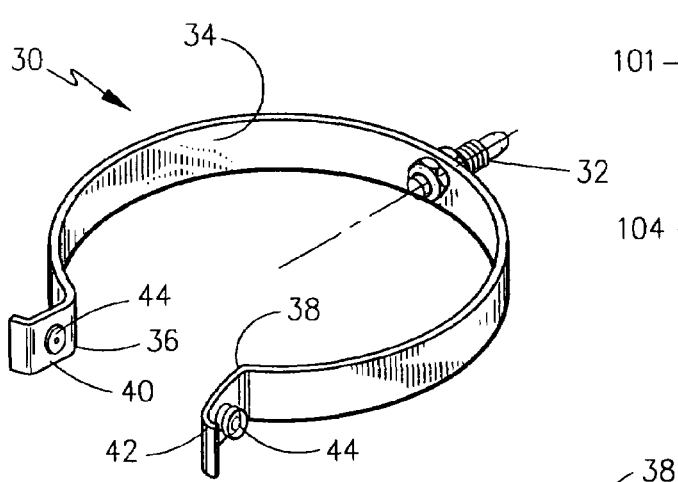
FIG. 2 is a perspective view of the filter spring clamp according to the exemplary embodiment of the present invention.

Therefore, in order to appreciate the invention, FIG. 1 illustrates a respective piece of machinery such as an engine 10 which has a lubricating system that includes component in the form of an oil filter 12. The oil filter 12 mounts to a threaded central port, and various addition circulation ports are provided so that oil may dynamically flow through the filter. Thus, as should be understood by the ordinarily skilled person in this field, when engine 10 is operating, oil filter 12 is pressurized to the pressure level of the engine. The present invention is in the form of a tap assembly that defines an oil pressure-testing device 20 which includes a spring clamp 30 which has associated therewith an pressure gauge assembly that includes an oil pressure gauge 60 that is in fluid communication with the tap 32 by means of a hose or conduit 64. Spring clamp 30 is held in a mounted position, as is shown in FIG. 1, by means of locking pliers 100 described below.

Figure 4:
FIG. 4 is a cross-sectional view taken about lines 4-4 of FIG. 3.
Figure 3:
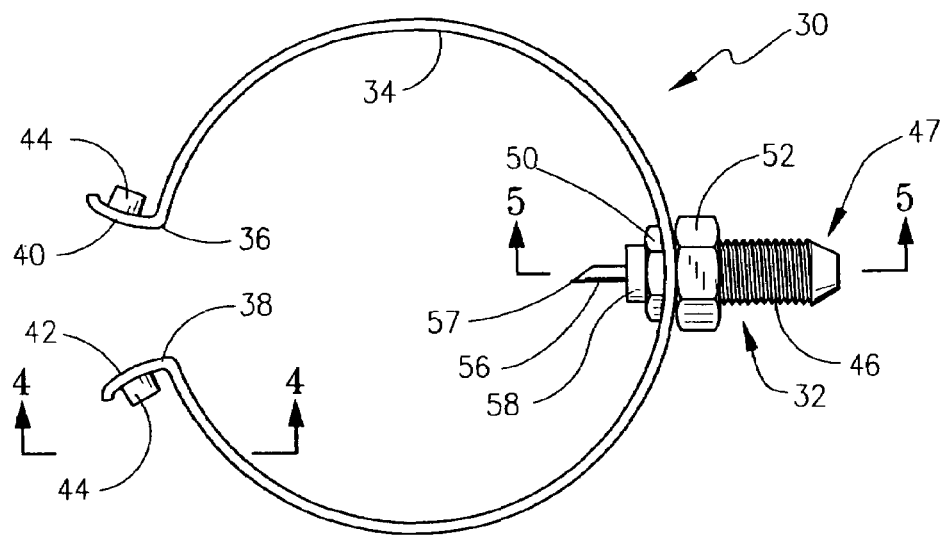
FIG. 3 is a top plan view of the filter spring clamp of FIG. 2.
Figure 5:
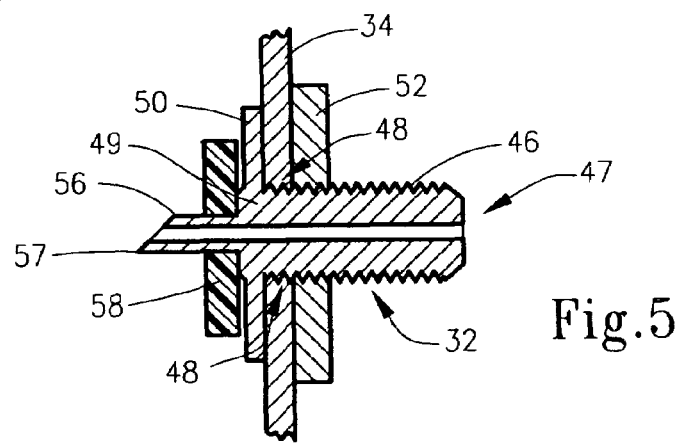
FIG. 5 is a cross-sectional view taken about lines 5-5 of FIG. 3.

With reference to FIGS. 2-6, spring clamp 30 is shown in greater detail wherein it may be seen that spring clamp 30 includes a C-shaped resilient band 34 that has a selected length that is sized and adapted to extend around a majority of the circumference of the cylindrical oil filter. Band 34 terminates in two free ends 36 and 38 that include, respectively, flanges 40 and 42. Band 34 is flexible but is not elastic. Each of flanges 40 and 42 are provided with a cup-shaped seat 44. As is illustrated in FIG. 4, each seat 44 is in the form of an annular ring 45 having a depression 47 formed therein. This annular ring 45 may be formed of any suitable material, such as metal, and is mounted to flange 40 or 42 by riveting or the like.

C-shaped band 34 is formed of a material such as spring steel, although it should be appreciated that other materials may be substituted provided they have sufficient strength to act as a clamp when spring clamp 30 is secured to oil filter 12. Band 34 has on opening 48 located somewhat diametrically opposite to flanges 40 and 42. A tap 32, as noted above, is disposed on band 34 by being mounted in this opening 48. As may be seen best in FIG. 5, tap 32 has a threaded mounting portion 49 that extends through opening 48 and has an opposite threaded shaft 46 that projects radially outwardly of band 34 to define a nipple 47. Band 34 is thus sandwiched between a first nut portion 50 that is formed integrally with shaft 46 and a second nut 52 threadably received on portion 49 and shaft 46 thereby to secure tap 32 to band 34. Shaft 46 has an axial bore 54 that extends therethrough with this bore terminating in a prong 56 oppositely of shaft 46. Bore 54 thus defines a fluid passageway. Prong 56 has a piercing tip 57, and a gasket 58 is then mounted in surrounding relationship to prong 56. Oil pressure gauge 60 is then secured to nipple portion 47 of tap 32 by means of a fitting 62 that communicates with a flexible hose or conduit 64 as is known in the art. Pressure gauge 60 can thus be placed in fluid communication with the interior of the component, such as oil filter 12.

Figure 6:
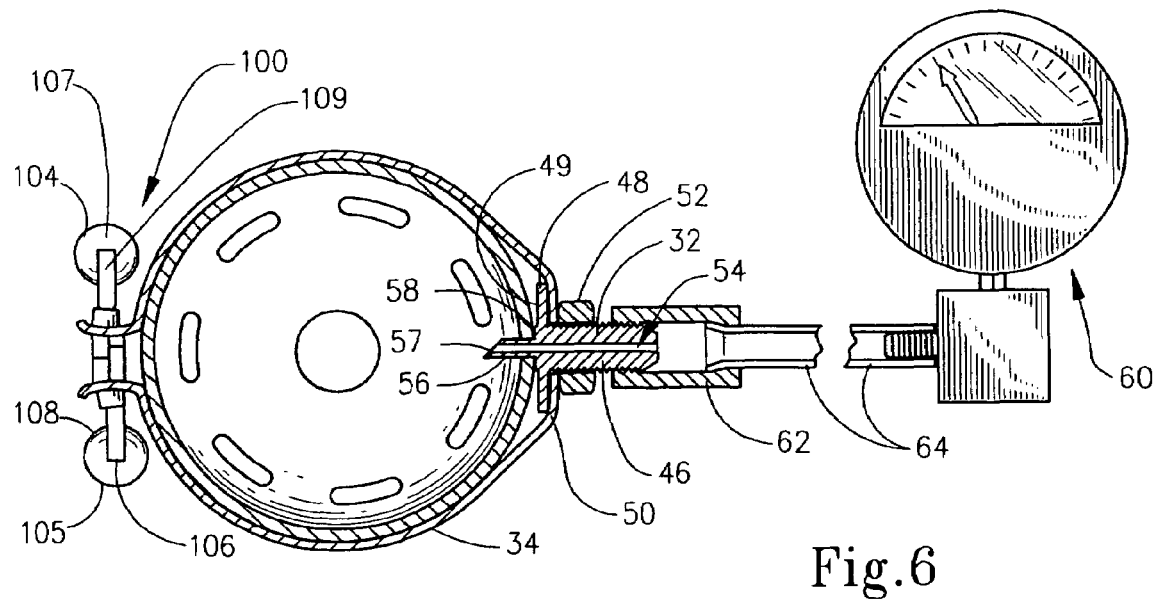
FIG. 6 is a top view in partial cross-section showing the oil pressure measuring device of FIG. 1 in operational use.

Spring clamp 30 is constructed to be used with a clamp which can forcefully move flanges 40 and 42 together with substantial force so as to "contract" band 34. This force causes prong 56 to penetrate the sidewall of an oil can as described below to define an active state. A representative pliers assembly is illustrated as clamping and locking pliers 100 that are suitable for these purposes is illustrated in FIGS. 1 and 6. As noted, these pliers are modified from a type that are used to engage piston rings for the engine cylinders. One such type of pliers is an over-cam pliers used for piston rings such as that designated K-D 1114 available from Danaher Tool. The modification is made to the tips, as described below with respect to FIG. 7.

Figure 7:
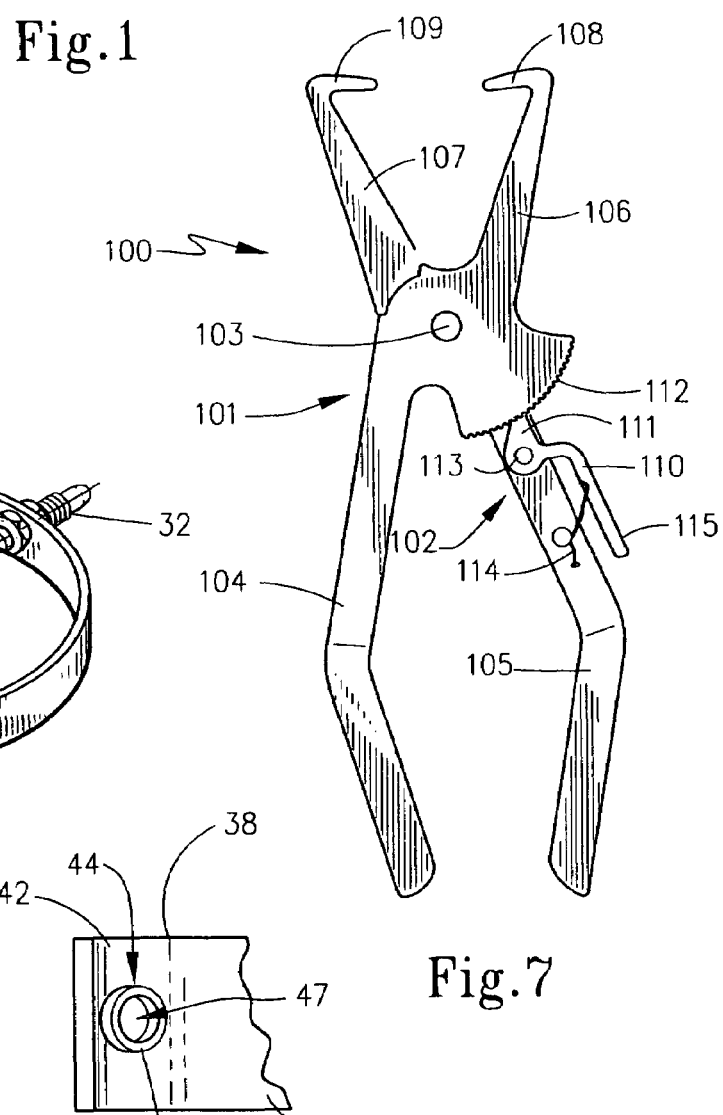
FIG. 7 is a side view in elevation showing the locking pliers that have been modified from a prior art pair of pliers that may be used in conjunction with the spring clamp of FIGS. 2-4 according to the present invention.

With reference, then, to FIG. 7, it may be seen that pliers 100 include first and second members 101 and 102 that are pivotally attached to one another on axle 103. Each of members 101 and 102 include a handle portion and a jaw portion. Thus, member 101 includes handle portion 104 and jaw portion 106; similarly, member 102 includes handle portion 105 and jaw portion 107. Jaw portion 106 and 107 terminate in inwardly turned finger portions 108 and 109 which are in an opposed relation to one another and can move between a more open position and a more closed position. Thus, as handle portions 104 and 105 are pressed together toward the more closed position, opposed finger portions 108 and 109, respectively on the ends of jaw portions 106 and 107, advance towards one another with a leveraged force.

Members 101 and 102 may be selectively locked into position against expansion by means of a latch assembly that includes cam lock 110 having a toothed nose 111 that engages gear teeth 112 on member 101. Cam lock 110 is pivotally mounted on pivot pin 113 to member 102 and is spring biased by means of spring 114 so that tooth nose 111 engages teeth 112. Due to the force of spring 114, this provides a ratcheting locking action. When it is desired to expand pliers 100, the user depresses lever 115 to disengage nose 111 from teeth 112 allowing handle portions 104 and 105 to move apart, and, correspondingly, jaw portions 106 and 107 to move apart.

The operation of the present invention may now be appreciated more thoroughly with respect to FIGS. 1 and 6. After securing oil pressure gauge 60 to tap 32, spring clamp 30, and specifically band 34, is positioned around sidewall 92 of oil filter 90. During this process, flanges 40 and 42 are moved apart from one another so as the interior diameter of spring clamp 30 is expanded so that spring clamp 30 may be slid along the outer surface of sidewall 92. Prongs 108 and 109 of locking pliers 100 in the more open position are then placed into engagement with the opposite end portions of band 34 such as by engaging seats 44. Handles 104 and 105 are compressed together so that jaws 106 and 107 move flanges 40 and 42 toward one anther, thereby tightening the band 34 by decreasing the diameter of spring clamp 30. This reduction in diameter presses prong 56 against sidewall 92 until piercing tip 57 ruptures sidewall 92 and penetrates into the interior of filter 90. Axial bore 54 is thereby placed in fluid communication with the interior chamber of oil filter 90. By this reduction in diameter, gasket 58 is also compressed against the outer surface of sidewall 92 to prevent oil leaks created by prong 56. With the engine running, oil pressure gauge 60 is now in fluid communication with the oil-containing interior of oil filter 90 so that the pressure inside of oil filter 90 may be directly read by gauge 60.

Figure 8:
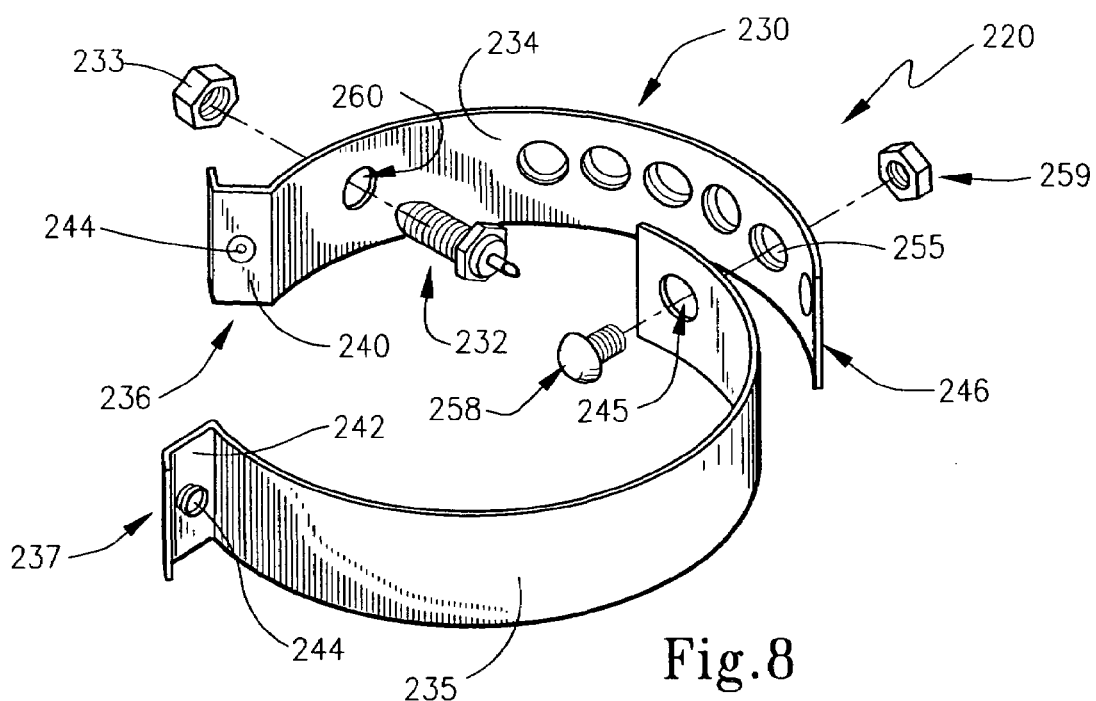
FIG. 8 is an exploded perspective view of a second embodiment of the present invention wherein the band is formed at a first and second band sections.
Figure 9:
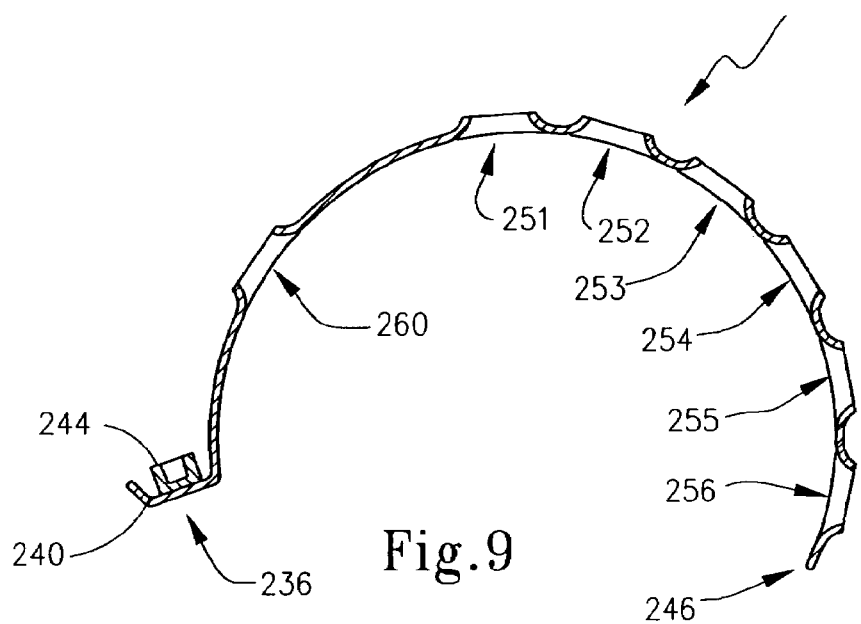
FIG. 9 is a top view in cross-section of a first band section of the embodiment of the tap assembly shown in FIG. 8.
Figure 10:
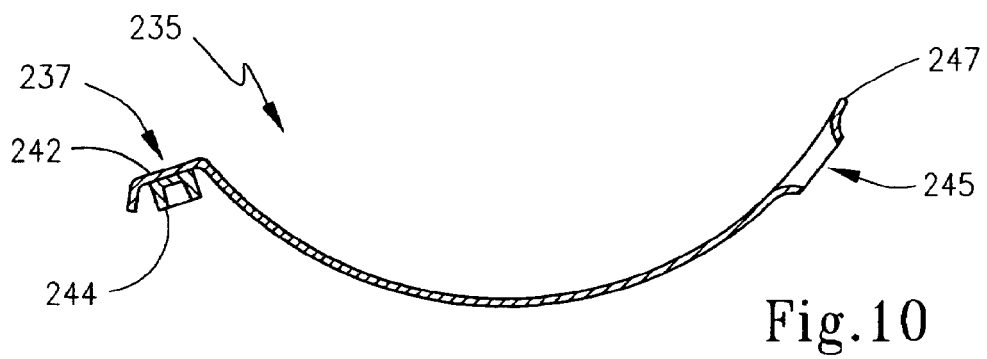
FIG. 10 is a top view in cross-section of the second band section of the tap assembly of FIG. 8.

A second exemplary embodiment of the present invention is illustrated in FIGS. 8-10. Here, tap assembly 220 includes a spring clamp 230 in the form of a C-shaped band that includes a first band section 234 and a second band section 235. Band sections 234 and 235 are formed of a non-elastic yet flexible material that is preferably a resilient metal. First band section 234 terminates in a free end 236 that includes a flange 240. Similarly, second band section 235 terminates in a free end 237 that includes flange 242. Each of flanges 240 and 242 support a cup-shaped seat 244 thereon, similar to the first embodiment.

Second band section 235 includes an opening 245 that is formed proximate to a second end 247 that is opposite first end 237 thereof. First band section 234 has a second end 246 that is opposite end 236, and a plurality of openings 251-256 are located along the length of first band section 234. Opening 245 is sized and adapted to mate with a selected one of openings 251-256 so as to vary the effective length of spring clamp 230. To this end, a nut and bolt combination 258 and 259 is shown in FIG. 8 in order to mate opening 245 with opening 255. Openings 251-256 also provide alternative mounting positions for tap 232 in addition to opening 260.

An opening 260 is formed in first band section 234 proximate to end 236 and is sized and adapted to receive a tap 232 secured thereto by nut 233. Tap 232 is identical to tap 32, described above, so that this description is not repeated. By providing openings 251-256, the ordinarily skilled artisan will appreciate that the band sections 234 and 235 are securable to one another thereby to adjust effective length of the band formed thereby.

Figure 11:
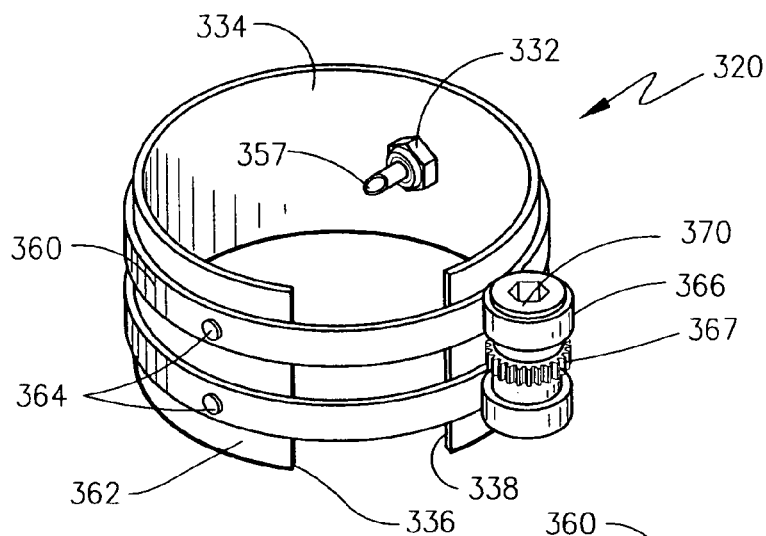
FIG. 11 is a perspective view of a third exemplary embodiment of the present invention.
Figure 12:
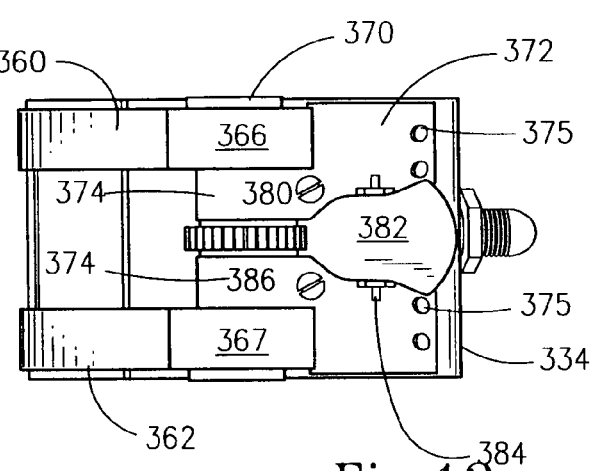
FIG. 12 is a side view in elevation of the tap device of FIG. 11.
Figure 13:
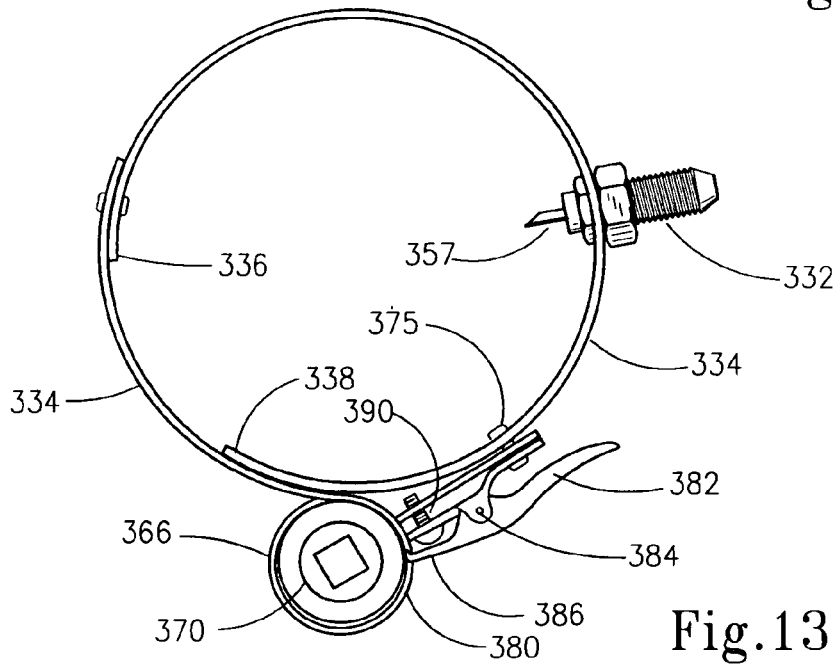
FIG. 13 is a top plan view of the tap assembly of FIG. 11.

A third exemplary embodiment of the present invention is illustrated in FIGS. 11-13. Here, tap assembly 320 includes a C-shaped band 334 again formed of a flexible yet non-elastic resilient material such as spring steel. Band 334 is C-shaped in configuration and includes opposite ends 336 and 338. A tap 332 is supported by bands 334 similar to that described with respect to the first exemplary embodiment, but it should be understood that band 334 is wider than band 34 described above.

In this embodiment, the means for tightening band 334 so as to cause prong 357 to penetrate the sidewall component is provided by at least one but preferably two belts 360 and 362 each of which has an end portion secured to band 334 such as by rivets 364. Belts 360, 362 encircle band 334 in confronting relationship and have end portions 366 and 367 wrapped on a spool 370. Spool 370 is, in turn, rotatably mounted to coiled fingers 374 of a bracket 372 that is mounted to band 334 proximate to end 338 such as by rivets 375. A tool socket 371 is provided to allow insertion of a tool to rotate the spool.

When spool 370 is rotated a first direction, end portions 366 and 367 of belts 360 and 362 will be wound upon spool 370 to tighten the band. When spool 370 is rotated in the opposite direction, the belts are loosened thereby to release tightening on band 334. In order to lock spool 370 against counter rotation when band 334 is being tightened, a toothed wheel 380 is rigidly affixed to spool 370. A lever 382 is pivotally journaled on pin 384 and includes a nose 386 that engages wheel 380 in a ratchet-like manner. To this end, lever 382 is spring biased so that nose 386 is biased to engage the teeth on wheel 380. A screw adjust 390 is provided to adjust the tension on lever 382.

This assembly therefore provides a ratchet latch that is associated with spool 370 with this ratchet latch being operative to remit ratcheting rotation of the spool in a first rotational direction and to prohibit rotation of the spool in an opposite second rotational direction. This structure is also similar to that used with piston ring compressors. However, the use of two separate belts 360 and 362 are provided to allow for a gap to accommodate passage of tap 332 therethrough.

From the foregoing, it should be appreciated that the present invention contemplates a method of measuring fluid pressure in a component of a fluid system wherein the component has a shell with an interior that contains fluid under pressure. For example, this especially concerns the measurement of oil pressure in a machine such as an internal combustion engine that has an oil filter as a component. This method broadly includes any of the steps inherent in the described devices.

More particularly, the general method of the present invention includes a first step of placing a penetrating point of a tap that has a fluid passageway therethough against a side wall portion of the shell of the component. The tap in next advanced such that the penetrating point pierces said shell thereby establishing fluid communication with the fluid in the component. The method can include the step of substantially sealing the tap against the side wall portion in such a manner so as to reduce any leakage of said fluid that is associated with the tap. The method then includes the step of measuring the pressure of the fluid in the passageway of the tap.

In this method, the tap may, for example, be disposed on a non-elastic yet flexible band. the step of advancing said tap can be accomplished by positioning this band around at least a portion of the shell so that the penetrating point is positioned against the side wall portion of the shell. Thereafter, tightening the band around the component that said tap is forcefully advances the tap against said shell thereby to penetrate the shell to define an active state and thereby establish fluid communication with the fluid inside of said component. The method also may include the step of lockable holding the tap in place while the pressure is measured. The step of measuring the pressure of the fluid in the passageway of the tap is accomplished by securing a hose to said tap and measuring fluid pressure in the hose by means of a pressure gauge.

It should be understood that the method may be used to measure oil pressure, for example, in an oil filter of a machine. Here, the method includes a step of tapping into an existing oil filter and thereby placing an oil pressure gauge in fluid communication with the oil system of the machine through the sidewall of the oil filter. The step of tapping is done in such manner so that any leakage from the filter is minimized. Moreover, the step of tapping into the filter is accomplished by driving a tap that has a passageway therethrough by placing a contracting force on opposite ends of a band that carries the tap so as to force the tap radially and compressively inwardly against the sidewall of the filter until the tap penetrates the sidewall to establish fluid communication with the interior of the filter. The method also may include the step of lockably holding the tap in place while the oil pressure is measured.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A tap assembly adapted to mount on a component of a fluid system wherein the component has a shell and contains fluid under pressure in said component, comprising:
   (A) a non-elastic yet flexible band having a length, said band sized and adapted to extend around at least a portion of said shell in a mounted state;
   (B) a tap disposed on and supported by said band, said tap having a fluid passageway therethrough;
   (C) means for tightening said band when in the mounted state such that said tap is forcefully advanced against said shell thereby to penetrate said shell to define an active state and thereby establish fluid communication with the fluid inside of said component.

2. A tap assembly according to claim 1 wherein said band includes a metal strap.

3. A tap assembly according to claim 2 wherein said metal strap has opposite end portions and including a flange on each said end portion.

4. A tap assembly according to claim 3 including a seat on each said flange.

5. A tap assembly according to claim 4 wherein said seats are cup-shaped in configuration.

6. A tap assembly according to claim 5 wherein said means for tightening includes a pliers assembly adapted to engage said seats.

7. A tap assembly according to claim 1 wherein said band is C-shaped in configuration.

8. A tap assembly according to claim 1 wherein said means for tightening includes a pliers assembly operative to move between a more open position and a more closed position and adapted to engage opposite end portions of said band.

9. A tap assembly according to claim 8 wherein said pliers assembly includes a latch assembly operative to retain said pliers assembly in the more closed position.

10. A tap assembly according to claim 9 wherein said latch assembly includes a ratchet structure associated therewith.

11. A tap assembly according to claim 1 wherein said means for tightening includes a belt including a first belt end portion secured to said band and a spool engaging a second belt end portion whereby said belt may be wound upon said spool thereby to tighten said band.

12. A tap assembly according to claim 11 including a ratchet latch associated with said spool and operative to permit ratcheting rotation of said spool in a first rotational direction and prohibit rotation of said spool in an opposite second rotational direction.

13. A tap assembly according to claim 12 wherein said ratchet latch includes a ratchet release operative to permit rotation of said spool in the second rotational direction.

14. A tap assembly according to claim 11 wherein said means for tightening includes first and second spaced-apart belts each including a first belt end portion secured to said band and a second belt end portion adapted to be wound upon said spool.

15. A tap assembly according to claim 1 wherein said band is formed by at least two band sections that are secureable to one another and including a connector operative to secure said band sections together.

16. A tap assembly according to claim 15 wherein said band sections are secureably at selected locations thereby to adjust the length of said band.

17. A tap assembly according to claim 1 wherein said tap includes a piercing prong and a gasket, said piercing prong operative to penetrate said shell and said gasket operative to help seal against the shell of said component when in the active state.

18. A tap assembly according to claim 1 wherein the component is a cylindrical oil filter and wherein said band is sized and adapted to extend around a majority of a circumference of said oil filter.

19. A tap assembly adapted to mount on a component of a fluid system wherein the component has a shell and contains fluid under pressure in said component, comprising:
   (A) a non-elastic yet flexible band sized and adapted to extend around at least a portion of said shell in a mounted state;
   (B) a tap disposed on and supported by said band, said tap having a fluid passageway therethrough; and
   (C) a tightening mechanism operative to engage spaced-apart portions of said band when in the mounted state and operative to selectively apply a contractive force therebetween such that said tap is forcefully advanced against said shell thereby to penetrate said shell and establish fluid communication with the fluid inside of said component.

20. A tap assembly according to claim 19 wherein said band includes a metal strap.

21. A tap assembly according to claim 20 wherein said metal strap has opposite end portions and including a flange on each said end portion.

22. A tap assembly according to claim 21 including a seat on each said flange.

23. A tap assembly according to claim 22 wherein said seats are cup-shaped in configuration.

24. A tap assembly according to claim 23 wherein said means for tightening includes a pliers assembly adapted to engage said seats.

25. A tap assembly according to claim 19 wherein said band is C-shaped in configuration.

26. A tap assembly according to claim 19 wherein said means for tightening includes a pliers assembly operative to move between a more open position and a more closed position and adapted to engage opposite end portions of said band.

27. A tap assembly according to claim 26 wherein said pliers assembly includes a latch assembly operative to retain said pliers assembly in the more closed position.

28. A tap assembly according to claim 27 wherein said latch assembly includes a ratchet structure associated therewith.

29. A tap assembly according to claim 19 wherein said means for tightening includes a belt including a first belt end portion secured to said band and a spool engaging a second belt end portion whereby said belt may be wound upon said spool thereby to tighten said band.

30. A tap assembly according to claim 29 including a ratchet latch associated with said spool and operative to permit ratcheting rotation of said spool in a first rotational direction and prohibit rotation of said spool in an opposite second rotational direction.

31. A tap assembly according to claim 30 wherein said ratchet latch includes a ratchet release operative to permit rotation of said spool in the second rotational direction.

32. A tap assembly according to claim 29 wherein said means for tightening includes first and second spaced-apart belts each including a first belt end portion secured to said band and a second belt end portion adapted to be wound upon said spool.

33. A tap assembly according to claim 19 wherein said band is formed by at least two band sections that are secureable to one another and including a connector operative to secure said band sections together.

34. A tap assembly according to claim 33 wherein said band sections are secureably at selected locations thereby to adjust the length of said band.

35. A tap assembly according to claim 19 wherein said tap includes a piercing prong and a gasket, said piercing prong operative to penetrate said shell and said gasket operative to help seal against said shell of said component when in the active state.

36. A tap assembly according to claim 19 wherein the component is a cylindrical oil filter and wherein said band is sized and adapted to extend around majority of a circumference of said oil filter.

37. A method of measuring fluid pressure in a component of a fluid system wherein the component has a shell with an interior that contains fluid under pressure in said component, comprising:
   (A) placing a penetrating point of a tap that has a fluid passageway therethough against a side wall portion of said shell;
   (B) advancing said tap such that the penetrating point pierces said shell thereby establishing fluid communication with the fluid in said component;
   (C) substantially sealing said tap against the side wall portion in such a manner so as to reduce any leakage of said fluid that is associated with said tap; and
   (D) measuring the pressure of said fluid in the passageway of said tap.

38. The method according to claim 37 wherein said tap is disposed on a non-elastic yet flexible band, the step of advancing said tap being accomplished by positioning said band around at least a portion of said shell so that said penetrating point is positioned against the side wall portion of said shell and thereafter tightening said band around the component such that said tap is forcefully advanced against said shell thereby to penetrate said shell to define an active state and thereby establish fluid communication with the fluid inside of said component.

39. The method according to claim 37 wherein the step of measuring the pressure of said fluid in the passageway of said tap is accomplished by securing a hose to said tap and measuring fluid pressure in said hose by means of a pressure gauge in fluid communication therewith.

40. The method according to claim 37 including the step of lockably holding the tap in place while measuring the pressure of said fluid.

41. A fluid pressure testing device adapted to test fluid pressure in a component of a fluid system wherein the component has a shell and contains fluid under pressure in said component, comprising:
   (A) a tap assembly including
      (1) a non-elastic yet flexible band having a length, said band sized and adapted to extend around at least a portion of said shell in a mounted state,
      (2) a tap disposed on and supported by said band, said tap having a fluid passageway therethrough,
      (3) means for tightening said band when in the mounted state such that said tap is forcefully advanced against said shell thereby to penetrate said shell to define an active state and thereby establish fluid communication with the fluid inside of said component; and
   (B) a pressure gauge assembly adapted to secure to said tap in fluid communication with the passageway thereof.

42. A fluid pressure testing device according to claim 41 wherein said pressure gauge assembly includes a hose and a pressure gauge.

43. A fluid pressure testing device adapted to test fluid pressure in a component of a fluid system wherein the component has a shell and contains fluid under pressure in said component, comprising:
   (A) a tap assembly including
      (1) a non-elastic yet flexible band sized and adapted to extend around at least a portion of said shell in a mounted state,
      (2) a tap disposed on and supported by said band, said tap having a fluid passageway therethrough, and
      (3) a tightening mechanism operative to engage spaced-apart portions of said band when in the mounted state and operative to selectively apply a contractive force therebetween such that said tap is forcefully advanced against said shell thereby to penetrate said shell and establish fluid communication with the fluid inside of said component; and
   (B) a pressure gauge assembly adapted to secure to said tap in fluid communication with the passageway thereof.

44. A fluid pressure testing device according to claim 43 wherein said pressure gauge assembly includes a hose and a pressure gauge.

\* \* \* \* \*